United States Patent [19]

Komeyama

[11] Patent Number: 5,006,005
[45] Date of Patent: Apr. 9, 1991

[54] LUBRICANT SUPPLY FOR UNIVERSAL JOINT

[75] Inventor: Nobuo Komeyama, Osaka, Japan

[73] Assignee: Koyo Seiko Co., Ltd., Osaka, Japan

[21] Appl. No.: 492,353

[22] Filed: Mar. 8, 1990

Related U.S. Application Data

[63] Continuation of Ser. No. 248,125, Sep. 22, 1988, abandoned.

[30] Foreign Application Priority Data

Sep. 25, 1987 [JP] Japan .............. 62-146785[U]

[51] Int. Cl.⁵ .................................. F16D 3/26
[52] U.S. Cl. ......................... 403/131; 403/134; 403/38; 464/11; 464/118; 464/905
[58] Field of Search ............... 403/131, 134, 122, 50, 403/38, 37, 34; 464/11, 15, 16, 118, 905

[56] References Cited

U.S. PATENT DOCUMENTS 2,987,896  6/1961  Griffith .......................... 464/118
3,162,471 12/1964  Mazziotti ........................ 403/38
3,301,008  1/1967  Beinke ......................... 464/905 X
3,605,931  9/1971  Firth et al. ................... 403/134 X
4,490,125 12/1984  Konrad et al. ................ 464/905 X
4,508,522  4/1985  Numazawa et al. ........... 464/118 X

FOREIGN PATENT DOCUMENTS 59-197620 11/1984 Japan .

Primary Examiner—Peter M. Cuomo

[57] ABSTRACT

A lubricant supply assembly for a universal joint comprises a universal joint, two rotation shafts connected via the universal joint and being capable of being bent relative to one another, ball-and-socket joints secured at the two rotation shafts, and a coupling tube provided at the universal joint for introducing a lubricant from one of the two rotation shafts to the other of the two rotation shafts. The coupling tube is a single tube. The end of the coupling tube is fixed to a ball in one of the ball-and-socket joints while the other end of the coupling tube slidably penetrates a ball in the other of the ball-and-socket joints to protrude from it.

5 Claims, 2 Drawing Sheets

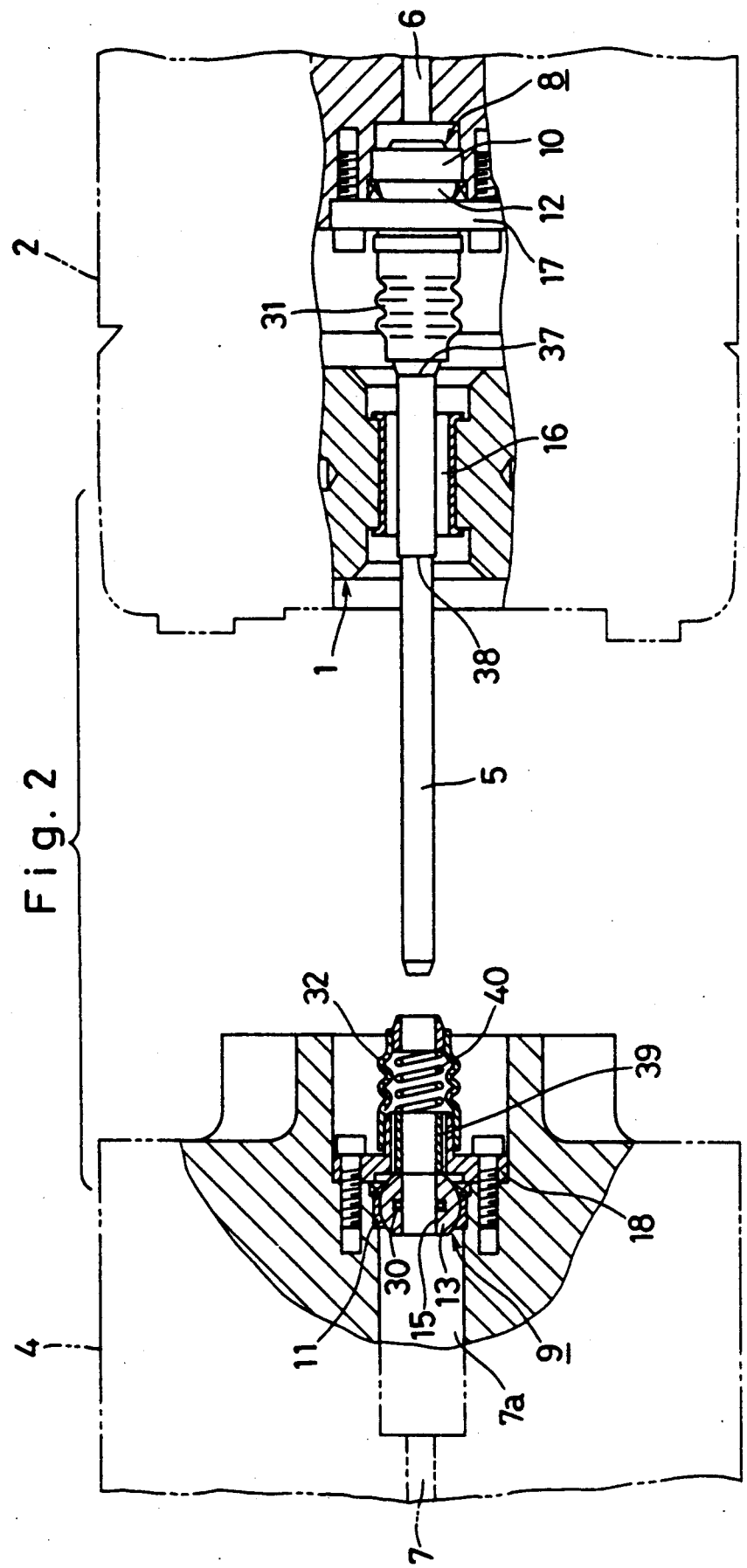

LUBRICANT SUPPLY FOR UNIVERSAL JOINT

This application is a continuation of application Ser. No. 07/248,125 filed on Sept. 22, 1988, now abandoned.

BACKGROUND OF THE INVENTION

The present invention relates to a lubricant supply for a universal joint and, more particularly, to a lubricant supply for a universal joint from a lubricant supply portion of one rotation shaft to a lubricant receiving portion of another rotation shaft, the two rotation shafts being capable of being bent relative to one another and being connected by the universal joint, via a cruciform shaft of the universal joint.

Conventionally, some types of lubricant supplies for universal joints are proposed. (For example, a LUBRICANT SUPPLY FOR UNIVERSAL JOINT is disclosed in Jpn.Kokai Tokkyo Koho JP No. 59-197620). However, they are complicated because a great number of parts are needed, so that many assembly steps are required.

Hence, a simple construction of a lubricant supply for a universal joint is needed.

SUMMARY OF THE INVENTION

Accordingly, it is an object of the present invention to provide an improved structure for a simple lubricant supply for a universal joint, so that it is easy to assemble the lubricant supply for the universal joint.

Other objects and further scope of applicability of the present invention will become apparant from the detailed description given hereinafter. It should be understood, however, that the detailed description and specific examples, while indicating preferred embodiments of the invention, are given by way of illustration only, since various changes and modifications within the spirit and scope of the invention will become apparant to those skilled in the art from this detailed description.

To achieve the objects, pursuant to the preferred embodiment of the present invention, a lubricant supply assembly for a universal joint comprises a universal joint, two rotation shafts connected via the universal joint which are capable of bending relative to one another, ball-and-socket joints secured at the two rotation shafts, and a coupling tube provided to the universal joint for introducing a lubricant from one of the two rotation shafts to the other of the two rotation shafts, the coupling tube being single. The end of the coupling tube is fixed to a ball in one of the ball-and-socket joints while the other end of the coupling tube slidably penetrates a ball in the other of the ball-and-socket joints to protrude from it.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIG. 2 shows a view for explaining assembly steps of the lubricant supply of FIG. 1.

DESCRIPTION OF THE PREFERRED EMBODIMENT

Figure 1:
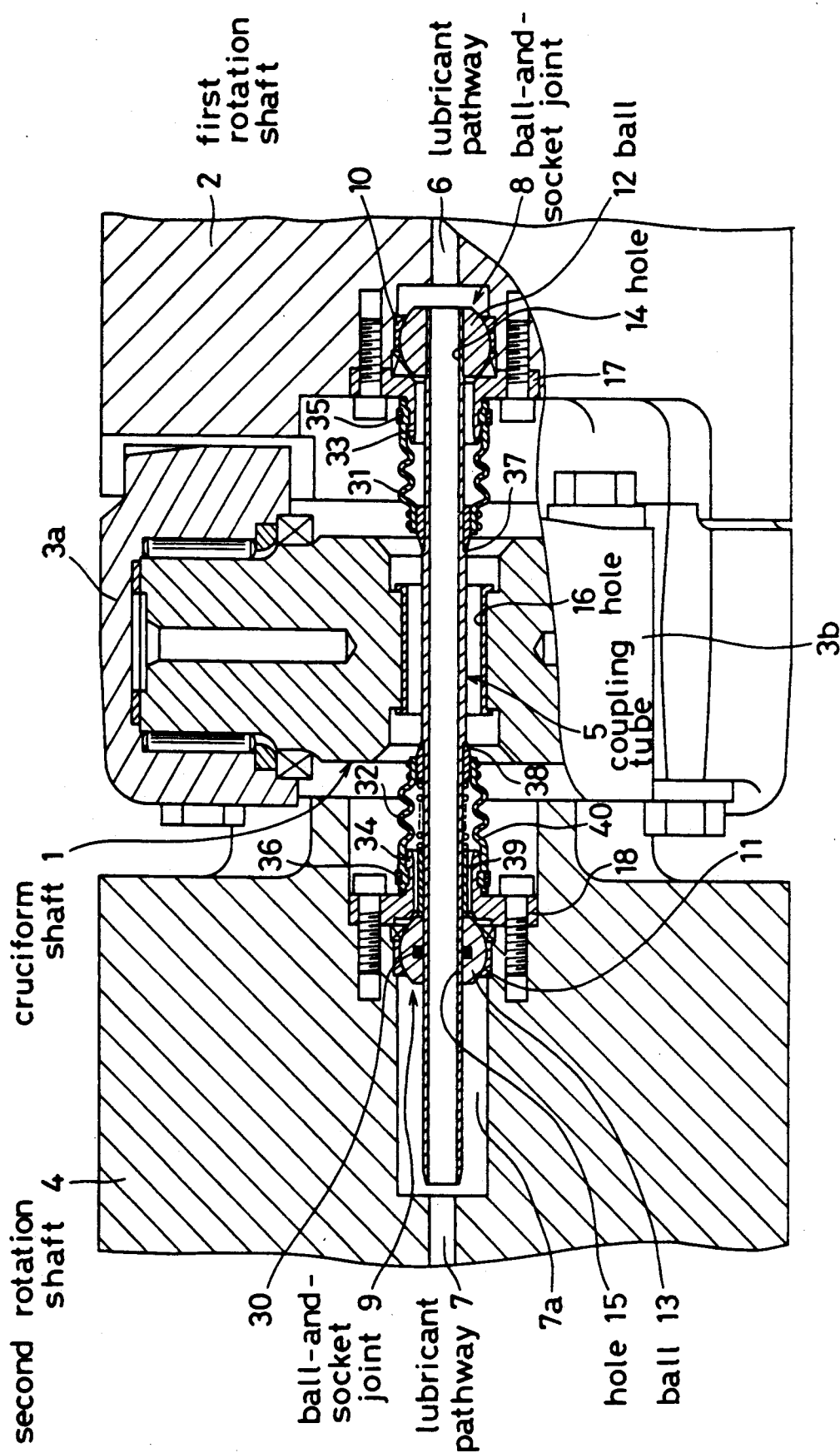
FIG. 1 shows a cross-sectional view of a lubricant supply for a universal joint according to the preferred embodiment of the present invention.

FIG. 1 shows a cross-sectional view of a lubricant supply for a universal joint according to the preferred embodiment of the present invention. The lubricant supply for a universal joint comprises a cruciform shaft 1, a first yoke 3a, a first rotation shaft 2 connected to the first yoke 3a, a second yoke 3b, a second rotation shaft 4 connected to the second yoke 3b, a coupling tube 5 for coupling lubricant pathways 6 and 7 respectively secured in the first and second rotation shafts 2 and 4, and ball-and-socket joints 8 and 9 for supporting the ends of the coupling tube 5.

The ball-and-socket joints 8 and 9 comprise concave spherical face portions 10 and 11, respectively provided at the opening sides of the pathways 6 and 7 in the first and second rotation shafts 2 and 4, and balls 12 and 13 rotatably fit on the concave spherical face portions 10 and 11. The balls 12 and 13 have holes 14 and 15 at the axes.

The coupling tube 5 is inserted into a through hole 16 formed in the cruciform shaft 1. Press plates 17 and 18 are provided for preventing the ball-and-socket joints 8 and 9 from getting away. The plates 17 and 18 are screwed to the rotation shafts 2 and 4.

According to the present invention, the coupling tube 5 is a single tube and is long. The end of the coupling tube 5 is inserted with pressure into the hole 14 of the ball 12 within the ball-and-socket joint 8 to be fixed thereto while the other end of the coupling tube 5 slidably penetrates the hole 15 of the ball 13 within the ball-and-socket joint 9 for engagement therewith. The protrusion of the coupling tube 5 is stored within a large opening 7a continuing from the opening side of the pathway 7 of the second rotation shaft 4. At the opening 15 of the ball 13, an O ring 30 is provided for preventing lubricant from leaking outward while the coupling tube 5 slides.

Bellows 31 and 32 for sealing are provided at the joints between the coupling 5 and the balls 12 and 13. The ends of the bellows 31 and 32 are jointed to graves 35 and 36 at cylinder portions 33 and 34 formed to the press plates 17 and 18 of the balls 12 and 13 while the other ends of the bellows 31 and 32 are attached with pressure to steps 37 and 38 formed at the central portion of the coupling tube 5. Within the bellows 32, a tube-like spacer 39 and a coil spring 40 are wound around the coupling tube 5, so that the expansion of the coil spring 40 forces the tube-like spacer 39 against the edge of the ball 13 to prevent longitudinal unstability of the coupling tube 5.

The lubricant supply of the universal joint of the present invention operates as follows. When lubricant is supplied to the pathway 6 of the first rotation shaft 2, it is introduced to the coupling tube 5 inserted into the opening 14 of the ball 12, whereafter the lubricant is introduced into the pathway 7 of the second rotation shaft 4. When the first and second rotation shafts 2 and 4 are bent, the balls 12 and 13 are rotated to incline the coupling tube 5 whereby tube 5 remains smooth. In compliance with the inclination of the coupling tube 5, the protrusion length of the coupling tube 5 from the ball 13 can be adapted by sliding, so that the distance between the balls 12 and 13 increases. With the ball-and-socket joints 8 and 9, good operability and sealing can be established even when the first and second rotation shafts 2 and 4 are bent.

FIG. 2 is a view for explaining the assembly steps of the lubricant supply of FIG. 1.

First, the ball-and-socket joint 8 is attached in the first rotation shaft 2. The end of the coupling tube 5 is inserted with pressure into the ball-and-socket joint 8. A universal joint is attached to the first rotation shaft 2. After the universal joint has been fixed, as shown in the left side of FIG. 2, the second rotation shaft 4 having the various parts at the opening of the pathway 7 is inserted into the hole 15 of the ball 13 in the ball-and-socket joint 9 with the coupling tube 5 being connected to the bellows 32, the tube-like spacer 39, and the coil spring 40. The second rotation shaft 4 is attached to the second yoke 3 of the universal joint.

According to the present invention, the coupling tube 5 is long enough, so that, for assembly, the coupling tube 5 is centered to the ball 13 independently of the work that the screws of the second rotation shaft 4 are centered to the screws of the cruciform shaft 1. The assembly is thereby simplified. To join the balls 12 and 13 and the coupling tube 5, fewer elements are provided to simplify the assembly.

Since the coupling tube 5 is a single tube, the outer diameter of the coupling tube 5 is small, so that it is unnecessary to enlarge the diameter of the through hole 16 of the cruciform shaft 1 too much and the cruciform shaft 1 can therefore remain rigid. Further, the coil spring 40 for preventing the longitudinal unstability of the coupling tube 5 is disposed at the outer side of the coupling tube 5, so that the joint between the coupling tube 5 and the pathways 6 and 7 is smooth and the flow of the lubricant at the joint is simply carried out.

As mentioned above, in accordance with the present invention, the good operability and sealing can be maintained even when the rotation shafts are bent relative to one another because of the use of the ball-and-socket joint. Because the long coupling tube is slidably jointed and protruded from the ball in the ball-and-socket joint, the coupling tube is centered to the ball independently of the work that the screws of the rotation shaft are centered to the screws of the cruciform shaft. The assembly is therefore easy.

Thus, superior and simplified lubricant supply for a universal joint is provided according to the present invention.

While only certain embodiments of the present invention have been described, it will be apparant to those skilled in the art that various changes and modifications may be made therein without departing from the spirit and scope of the present invention as claimed.

What is claimed is:

1. A lubricant supply assembly for a universal joint comprising:
    a universal joint;
    two rotation shafts connected via said universal joint, each of said rotation shafts having a lubricant pathway defined therein and said two rotation shafts being bendable relative to one another;
    ball-and-socket joints secured at said two rotation shafts, each ball of the ball-and-socket joints having a hole defined therein;
    a coupling tube provided at said universal joint for introducing a lubricant from one of said pathways of one of the two rotation shafts to the other of said pathways of the other of the two rotation shafts, said coupling tube being a single tube having two ends, a first end of said coupling tube being fixed in the hole of one ball in one of said ball-and-socket joints while a second end of said coupling tube is engaged with and guided by an internal surface of the hole of the ball in the other of said ball-and-socket joints, the second end of said coupling tube slidably penetrates and protrudes through said ball in the other of said ball-and-socket joints, the second end of the coupling tube further extends into an opening defined in one of the rotation shafts, the opening in the one rotative shaft being a part of the lubricant pathway and having a diameter greater than a diameter of the coupling tube, said coupling tube being movable relative to the ball in the other of said ball-and-socket joints to thereby remain unflexed even during bending between said two rotation shafts.

2. The lubricant supply assembly as set forth in claim 1, further comprising bellows for sealing a joint between said coupling tube and said balls of said ball-and-socket joints.

3. The lubricant supply assembly as set forth in claim 1, further comprising coil spring means for covering a portion of said coupling tube and for urging said coupling tube against the ball of one of said ball-and-socket joints.

4. The lubricant supply assembly as set forth in claim 1, wherein the ball of the other of said ball-and-socket joints has a sealing member therein, said sealing member being the only structure between the ball of the other ball-and-socket joint and the second end of the coupling tube.

5. The lubricant supply assembly as set forth in claim 4, wherein the sealing member is an O ring.

* * * * *